Patented Aug. 22, 1939

2,170,372

UNITED STATES PATENT OFFICE 2,170,372

AZO DYESTUFFS

Walter Kern, Sissach, and Richard Tobler, Riehen, Switzerland, assignors to the firm of Society of Chemical Industry in Basle, Basel, Switzerland No Drawing. Application May 21, 1938, Serial No. 209,377. In Switzerland June 2, 1937

6 Claims. (Cl. 260—204)

It has been found that valuable azo-dyestuffs of the general formula

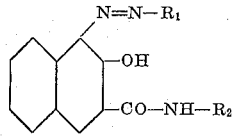

wherein $R_1$ is an aryl radical and $R_2$ a pyrene radical, may be obtained by uniting diazo compounds with ortho-hydroxycarboxylic acid arylides of the general formula

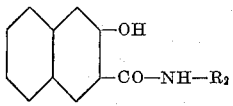

wherein $R_2$ stands for a pyrene radical.

Ortho-hydroxycarboxylic acid arylides of the above general formula may for example be obtained by conversion of 2:3-hydroxynaphthoic acid which may be substituted in the heteronucleus for example by halogen or alkoxy groups, or its functional derivatives, such as for instance the halides with aminopyrenes, such as for instance 3-aminopyrene or 4-aminopyrene, as well as the nuclear substitution products thereof which may contain for instance halogen, such as chlorine or bromine, alkoxy groups, such as methoxy or ethoxy groups, or nitro groups as substituents.

The union of the diazo-compounds with the ortho-hydroxycarboxylic acid arylides to azo-dyestuffs may be effected in usual manner in substance or on the fiber, such as for instance on the vegetable fiber. The diazo-compounds may for instance belong to the benzene or to the naphthalene series. They may be obtained by diazotizing aminobenzenes or aminonaphthalenes. These amines may contain the most various substituents besides the amino group. Such substituents are for instance methyl groups, halogens, such as for example chlorine or bromine, nitro groups, sulfonic acid groups, carboxyl groups, hydroxyl groups, alkoxy groups, such as for instance methoxy or ethoxy groups. Further these amines may contain as substituents also acetylamino groups, which themselves may be substituted by phenoxy groups. As diazo-compounds there are also useful diazotized amino-azo-benzenes. The diazo-compounds may also be used as stabilized diazo-compounds or in the form of their N-nitrosamines or their diazo-amino-compounds, as well as in mixture with the arylides or their alkali salts, respectively, in the form of preparations.

The azo-dyestuffs produced in substance may be used for dyeing or coloring the most various materials, such as for example lakes and varnishes.

The azo-dyestuffs produced according to the present invention dye in the most various shades, and these are very fast, particularly also excellently fast to light. Especially valuable are the dyestuffs which are produced on the fiber according to the usual methods of dyeing with ice colors.

The following examples illustrate the invention, the parts being by weight unless otherwise stated, and the parts by weight being related to the parts by volume as in the kilo to the litre:—

Example 1

16.2 parts of 2:5-dichloraniline are diazotized in the usual manner. The clear solution thus obtained is introduced into a solution consisting of 38.7 parts of the conversion product from 1 mol 2:3-hydroxynaphthoic acid with 1 mol 3-aminopyrene, 60 parts of sodium hydroxide solution of 30 per cent strength, 15 parts of sodium carbonate and 2000 parts of water. The dyestuff thus obtained of the formula

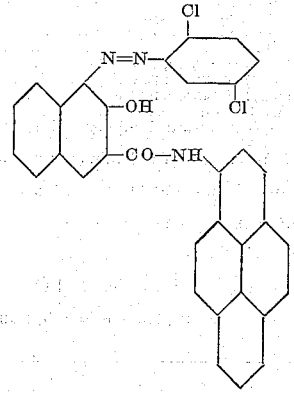

precipitates at once. The red-brown precipitate is filtered and dried.

If instead of the above conversion product the conversion products from 1 mol 2:3-hydroxy-naphthoic acid and 1 mol 3-amino-8- or -10-chloropyrene or from 1 mol 2:3-hydroxy-naphthoic acid and 1 mol 3-amino-8-nitro- or -10-nitropyrene, or from 1 mol 2:3-hydroxy-naphthoic acid and 1 mol 4-aminopyrene are used, there are obtained similar dyestuffs.

Example 2

Cotton yarn is impregnated with the following grounding solution: 1 gram of the product of the reaction of 2:3-hydroxynaphthoic acid with 3-aminopyrene is dissolved by means of 3 grams of sulfite cellulose waste liquor, 5 cc. of alcohol, 3.5 cc. of sodium hydroxide solution of 36° Bé. and 4 cc. of Turkey red oil, and the whole is introduced at room temperature into a solution consisting of 980 cc. of water, 10 cc. of sodium hydroxide solution of 36 per cent strength and 10 cc. of Turkey red oil, while stirring. A clear solution is thus obtained. The material is then wrung out and developed with a diazo-solution neutralized with sodium acetate and corresponding with 2 parts of 1-amino-2-methoxy-5-chlorobenzene per 1000 parts by volume, whereupon the dyestuff of the formula

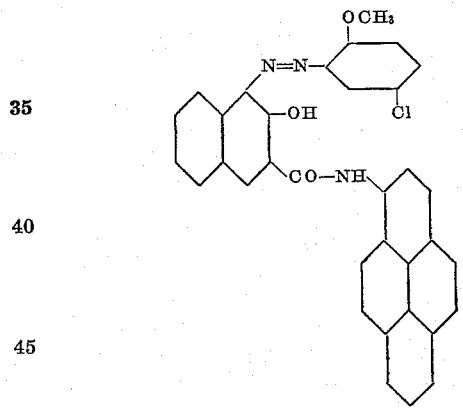

is formed. There is obtained a pure Bordeaux red shade of very good properties of fastness.

The following table shows a number of other shades obtainable in accordance with the invention:—

Such arylides can also be used for dyeing in the piece or for printing.

The amines which are on the basis of the diazo-compounds used in the above table have the following formulas:

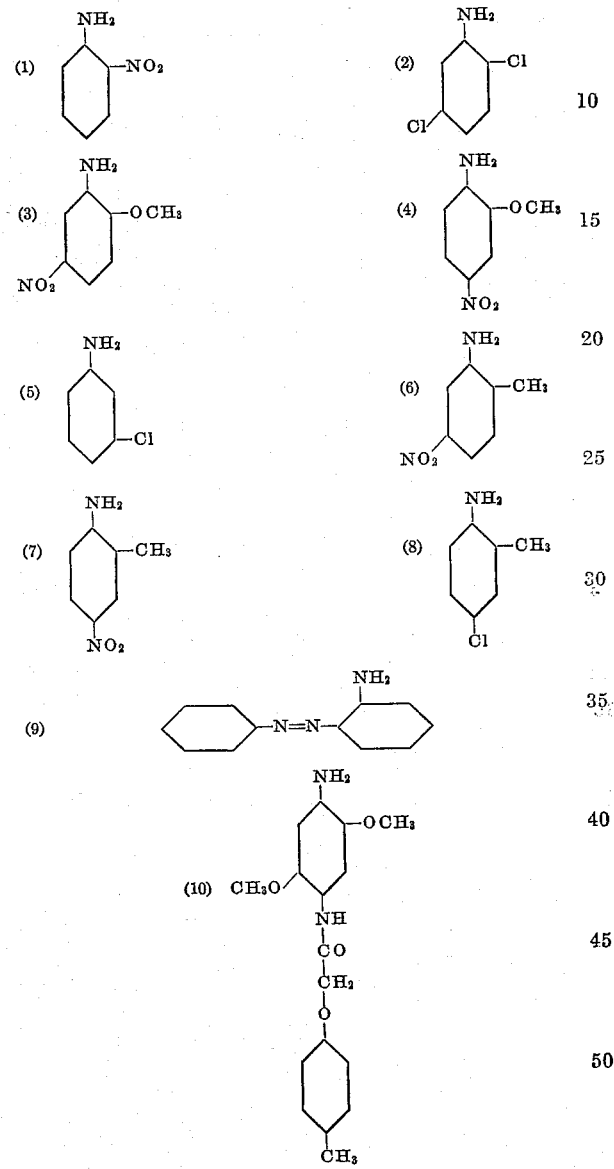

| | Diazo-component | Coupling-component | Shade |
|---|---|---|---|
| 1 | Ortho-nitraniline | Product of the reaction of 2:3-hydroxynapthoic acid and 3-aminopyrene. | Red-brown. |
| 2 | 2:5-dichloraniline | do | Do. |
| 3 | 1-amino-2-methoxy-5-nitrobenzene | do | Bordeaux. |
| 4 | 1-amino-2-methoxy-4-nitrobenzene | do | Violet. |
| 5 | Meta-chloraniline | do | Yellow-brown. |
| 6 | 1-amino-2-methyl-5-nitrobenzene | do | Red-brown. |
| 7 | 1-amino-2-methyl-4-nitrobenzene | do | Corinth. |
| 8 | 1-amino-2-methyl-4-chlorobenzene | do | Brown-red. |
| 9 | Ortho-aminoazobenzene | do | Corinth. |
| 10 | 4-(4' - methyl)-phenoxy-acetylamino-2:5-dimethoxy-1-aminobenzene. | do | Violet. |
| 11 | 4-(4' - methyl)-phenoxy-acetylamino-2:5-diethoxy-1-aminobenzene. | do | Navy-blue. |
| 12 | 4- (2'-methyl) -phenoxy-acetylamino-2:5-diethoxy-1-aminobenzene. | do | Do. |
| 13 | 4-amino - 2:5-diethoxy-2'-methylsulfamide-4' - nitro-1:1'-azobenzene. | do | Black. |
| 14 | 4-amino - 2:5-diethoxy-2'-methysulfone-4'-nitro-1:1 azobenzene. | do | Do. |
| 15 | 4-amino - 2:5-diethoxy - 2'-nitro-4'-methylsulfone-1:1'-azobenzene. | do | Do. |
| 16 | 4-amino-2-methoxy - 5-acetylamino-2'-methylsulfone-4'-nitro-1:1'-azobenzene. | do | Do. |

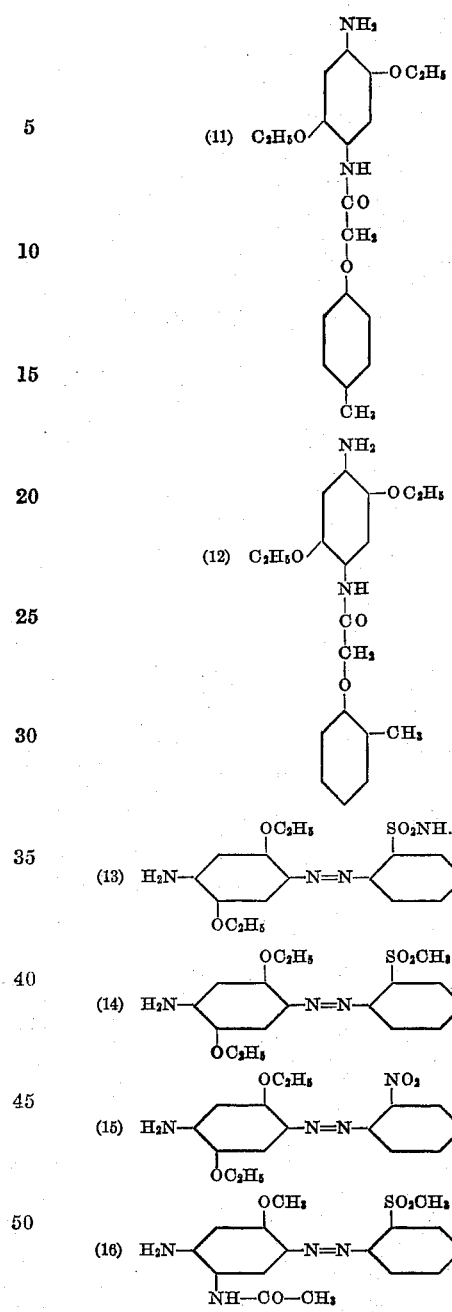

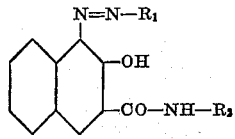

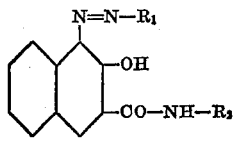

What we claim is:
1. The azo-dyestuffs of the general formula

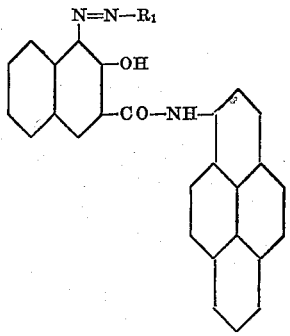

wherein R₁ is an aryl radical and R₂ is an aryl radical selected from the group consisting of pyrene and nitropyrene.
2. The azo-dyestuffs of the general formula $$\text{(formula)}$$

wherein R₁ is a phenyl radical and R₂ is an aryl radical selected from the group consisting of pyrene and nitropyrene.

3. The azo-dyestuffs of the general formula

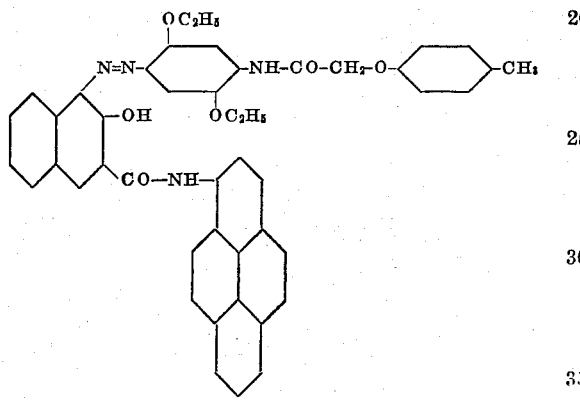

wherein R₁ is a phenyl radical.

4. The azo-dyestuff of the formula (formula as shown)

5. The azo-dyestuff of the formula

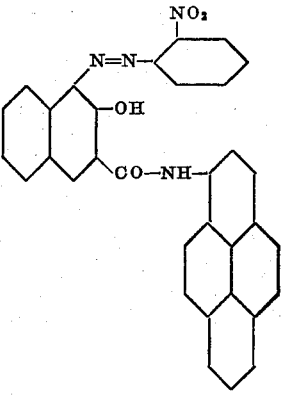

6. The azo-dyestuff of the formula

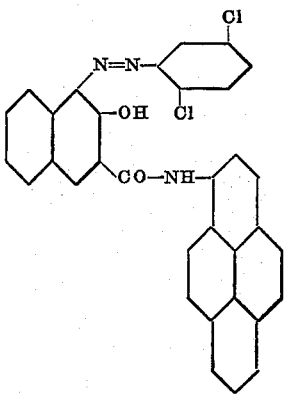

WALTER KERN.
RICHARD TOBLER.